ent [19]

United States Patent [19]

Carmon

[11] 4,183,738
[45] Jan. 15, 1980

[54] GRANULATION PROCESS AND PRODUCTS PRODUCED THEREBY

[75] Inventor: Samuel Carmon, Arad, Israel

[73] Assignee: International Fertilizer Development Center, Muscle Shoals, Ala.

[21] Appl. No.: 795,043

[22] Filed: May 9, 1977

[51] Int. Cl.² .................... C05B 17/00; C05C 1/02
[52] U.S. Cl. .................... 71/50; 23/313 R; 71/31; 71/33; 71/51; 71/53; 71/59; 71/60; 71/61; 71/63; 71/64 DA
[58] Field of Search ............ 71/64 DA, 31, 33, 50, 71/51, 53, 60, 61, 63, 59

[56] References Cited
U.S. PATENT DOCUMENTS

| | | | |
|---|---|---|---|
| 3,660,068 | 5/1972 | Wilson | 71/64 DA |
| 3,692,511 | 9/1972 | Wilson et al. | 71/64 DA |
| 3,725,029 | 4/1973 | Blackmore | 71/64 DA |
| 3,776,713 | 12/1973 | Quanquin et al. | 71/64 DA |
| 3,853,490 | 12/1974 | Boeglin et al. | 71/64 DA |
| 3,923,489 | 12/1975 | Richardson | 71/64 DA |
| 4,008,065 | 2/1977 | Hauschild | 71/64 DA |

*Primary Examiner*—Leland A. Sebastian
*Attorney, Agent, or Firm*—Sughrue, Rothwell, Mion, Zinn and Macpeak

[57] ABSTRACT

A granulation process for the production of high purity granules of salt material comprising:
(a) a wet blend formed by intensively mixing together
  (i) particles of soluble fine water-soluble salt having a relatively wide size distribution over the range of from about −30 to about +325 screen size (Tyler mesh),
  (ii) water insoluble particles of about −150 screen size (Tyler mesh) with surface area above 1 $M^2/gr$, and
  (iii) sufficient water or saturated water solution to provide a moisture content of up to about 20% and preferably in the range of from about 5 to 15% by weight of the mixture,
(b) granulating the wet blend from (a), preferably by pan granulation, and
(c) drying and recovering the granular product.

The product comprises a granular salt product which has the properties of high purity (up to 99% salt), uniform size distribution in the range of from about 2 to 4 mm, a crush strength of greater than about 3 lb/granule and generally in the range of from about 5 to 10 lbs. and a final moisture content of about 1.0% or less.

5 Claims, 1 Drawing Figure

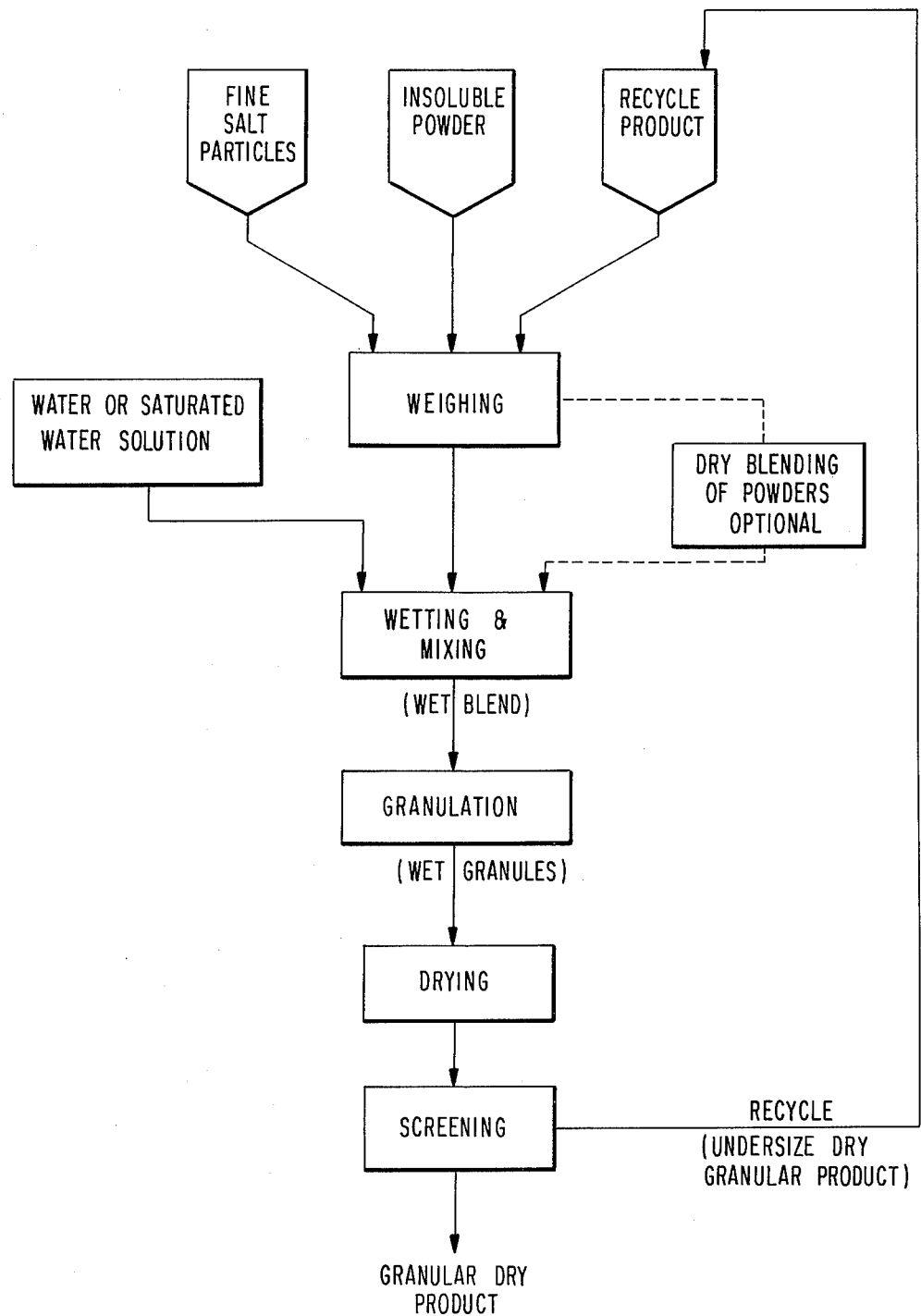

GRANULATION PROCESS AND PRODUCTS PRODUCED THEREBY

The invention described herein was made in the course of work under a grant or award from the Agency for International Development.

BACKGROUND OF THE INVENTION

The present invention relates to a process for producing relatively large salt granules of uniform particle size, high purity and excellent crush strength, and also to the resulting salt granules themselves.

While the invention has broad applicability in the production of salt granules, it is particularly useful in providing granules of salts which are useful as fertilizers, especially nitrogen and potassium containing salt granules.

For a variety of reasons the agricultural industry has in recent years turned increasingly to bulk blending techniques for formulating fertilizer blends for field application. Bulk blending involves the mixing of granules of phosphorous containing materials with granules of the other principal fertilizer components, i.e., N and K, to produce a blend especially formulated to meet local needs. Since the fertilizer requirements of a given field will depend upon many circumstances including soil composition, recent crop and fertilizer history, manner of irrigation, etc., it is desirable to custom blend the final fertilizer formulation to suit the desired fertilizer analysis for a given application site.

In order to achieve this objective the agriculture industry has practiced bulk blending on a relatively localized geographical basis. According to this practice, granules containing P, N and K, the three principal fertilizer elements, are separately shipped in bulk to large numbers of bulk blending plants located strategically throughout the agricultural sections of the country.

In order to be useful in such bulk blending operations the granular materials must resist caking during shipping and handling. If the materials do not retain their free flowing properties they cannot be used successfully in the blending equipment used for bulk blending. The granules must also have strength properties, such that the granules can resist breakdown into fine powdered particles during shipping. The reduction of the granules to fine powder during transport results in loss of material and makes it generally impossible to obtain blends of the desired analysis using equipment designed to handle granules of certain specified particle size distribution.

Another important property of granular fertilizer materials suitable for bulk blending and field application is that the size distribution of the granules be closely controlled. Uniform size distribution of all components of the fertilizer is necessary to prevent size segregation in bulk blending equipment and field application equipment.

While the fertilizer industry has been successful in developing processes for producing granules of phosphorous (P) containing materials suitable for use in bulk blending, the industry has been less successful in providing suitable granules of nitrogen (N) and potassium (K) containing materials due to a number of problems.

According to the present invention, a solution to these problems is provided by a unique granulation process which makes available for the first time N and K containing salt particles having purity, strength and particle size properties fully compatible with bulk blending and field application requirements.

DESCRIPTION OF THE PRIOR ART

The prior art has succeeded in producing granules of fertilizer components containing N and K primarily by prilling melt granulation or crystallization processes. The problems resulting from the utilization of prilling melt granulation or crystallization processes generally recognized throughout the fertilizer industry have been associated with the small size of the resulting granules. The smaller granules from these processes cause severe problems of segregation in bulk blending because they tend to produce non-uniform compositions and consequent non-uniform crop response. The latter is a serious problem in terms of harvesting of the crops on schedule and the use of large scale non-selective automated harvesting equipment.

No process to date has succeeded in producing soluble nitrogen or potassium fertilizers as free flowing, high purity salt granules with the combination of the desired size distribution in the range of about 2 to 4 mm and the necessary crush strength of about 3 lbs/granule or above.

Heretofore, most of the processes for the production of granules of soluble fertilizer components have yielded products which are unsuited for bulk blending by reason of small size or low strength.

The prior art does contain descriptions of early attempts to granulate nitrogen containing materials as disclosed for example in U.S. Pat. No. 1,406,455 issued Feb. 14, 1922 to Halvorsen. According to Halvorsen, one part of powdered phosphate is mixed with from 2 to 10 parts of ammonium nitrate, the mixture is moistened, and the moistened mixture is granulated while being heated to dry the mass. The disclosure of Pat. No. 1,406,455 is similar to slurry granulation and is virtually silent on the process parameters and product properties which, as will be seen below, form the basis for the unique results obtained in accordance with the instant invention. Another prior art disclosure, U.S. Pat. No. 3,923,489 issued Dec. 2, 1975 to Richardson, describes the mixture of 1 part of dry ammonium sulphate and 3 parts of fly ash followed by treatment of the mixture with a saturated solution of ammonium sulphate and water to form a wet doughy mass which is formed into pellets and dried. Again, the specification in Richardson is devoid of disclosure of the process and products of the present invention.

The prior art is also replete with disclosures of processes for producing granular materials which may contain soluble salts and which produce in situ a cementation binder or soluble salt together with cementation binder like calcium, sulfate, clay, etc. Such processes also frequently involve drying "during" granulation, a different process which, as noted above, is akin to slurry granulation. Illustrative of such disclosures are U.S. Pat. Nos. 2,061,534; 2,107,701; 2,107,702; 2,140,340; 3,092,289 and 3,214,261.

The formation of ammonium sulfate granules by crystallization from solution is exemplified in U.S. Pat. No. 2,021,093 issued Nov. 12, 1935 to von Kreisler. As noted earlier, such processes are usually dependent on nucleation and evaporation and do not yield crystals of suitable size.

Accordingly, the purpose of the present invention is to provide an economical process for the continuous production of granular salt particles, especially N and K containing salts, which have particle size distribution and strength properties previously unattainable in the prior art.

A further objective is to provide granular salt products having a superior combination of particle size and strength properties and also wherein the salt is present in a high degree of purity, i.e., about 95% or greater.

SUMMARY OF THE INVENTION

Applicant has discovered a novel process for producing granules of soluble salts, and particularly granules of agronomically valuable salts by a process which yields granules having properties which are useful as components in the dry, bulk blending and field application of granular fertilizer formulations.

In brief summary, the present invention contemplates a novel process for the production of granules of soluble salts having desirable size and strength characteristics and also novel granular salt products produced by the process, as follows:

A. The Process

The process of this invention generally comprises:
(1) forming a uniform mixture of
 (a) particles of a soluble salt, the bulk of which have a size of less than about 30 mesh and which have a relatively wide size distribution over a range of several hundred mesh so as to permit compaction, as is well known in the art. The salt should be thermally stable at temperatures about 150° C.
 (b) particles of insoluble solids of relatively high surface area (above 1 m$^2$/gr.) Porous particles having a size of less than 100 mesh and preferably less than 150 mesh provide the necessary high surface area. The amount of insoluble solids is generally in the range of from about 1% to 30% by weight and preferably from about 1 to 5% by weight of the salt, and
 (c) water or saturated water solution to provide a moisture content of up to about 20% and preferably from about 8 to 14% by weight of the combined weights of salt and insoluble solid.
(2) granulating the mixture of Step (1), and
(3) drying the granulated material of Step (2).

B. The Product

The product is a free flowing granular material having a size distribution in the range of from about 2 to 4 mm and a crush strength of greater than 3 lbs/granule, usually in the range of 5–10 lbs/granule.

BRIEF DESCRIPTION OF THE DRAWING

The single FIGURE of the drawing is a flow diagram illustrating the process of the present invention.

DETAILED DESCRIPTION OF THE INVENTION

As described above, the present invention comprises a process for producing superior granular salt materials especially useful in bulk transportation and blending and field application of fertilizer formulations.

The process comprises first mixing particles of one or more soluble salt compounds with particles of an insoluble material and water.

Suitable salts include ammonium sulfate and nitrate and potassium chloride and sulfate. Ammonium sulfate is presently available in large quantities as an industrial waste or low value by-product. This process provides a route for the efficient and profitable use of waste ammonium sulfate in producing a valuable granular fertilizer. While these salts are preferred because they provide fertilizer nutrient components, any other soluble salt capable of being ground or produced to the necessary particle size distribution may be employed.

The size distribution of the salt particles is important. Salt powders in which more than about 50% of the particles are +30 mesh cannot be used effectively in the process. Preferably, most of the particles are −30 mesh and for best results substantially all of the salt particles should be −30 mesh. A wide size distribution range for the salt particles is also necessary to produce satisfactory granules. A distribution down to 400 hundred mesh is desirable. Research to date has indicated that a fairly wide range of size distribution may be used successfully in this process. A wide size distribution as known by the art as that size distribution which provides for good compaction of any powder material.

The high surface area insoluble material is used in an amount of from about 1 to 30% and preferably 1 to 5% by weight of the soluble salt. The particle size of the insoluble material is generally about −100 mesh and preferably about −150 mesh and the desired surface area should be above 1 m$^2$/gr.

Suitable insoluble materials include powders of phosphate rock, e.g., North Carolina phosphate rock, Israeli (oron) phosphate rock, Pescha phosphate rock (Columbia), calcium carbonate, calcium sulfate, carbon black, etc. The surface area of the powder varied from 1–200 m$^2$/gr.) While the specific composition of the insoluble material is not critical, phosphate rock is particularly preferred where fertilizer products are to be produced since the phosphate rock provides nutrient P to the composition.

The crush strength of the final product granules increases with the increase in the amount of insoluble powder added to the mixture.

The fine soluble salt and powdered insoluble material may be mixed together and with water in any suitable way as long as intimate admixture is achieved and a relatively homogeneous composition is produced. In the laboratory it has been found convenient to dry blend the powders and then mix with added water. On a large scale it is contemplated that intensive mixing can be accomplished by adding the powders and water in an Eirisch mixer. The amount of added water is sufficient to provide a moisture content of up to about 20% by weight of the combined solids and preferably from about 8 to 14%. The moisture content must be compatible with granulation by pan, drum or other granulation techniques.

Once the wet blend has been formed it is granulated. Pan granulation is preferred, but drum granulation is also feasible. Typically, granulation may be accomplished by continuously feeding the wet blend to a pan granulator and processing the blend for about 20–30 minutes. The laboratory 16″ pan is operated batchwise starting at an angle of about 70° and a speed of about 5 rpm and the angle and speed are adjusted thereafter to form a "rolling-bed" reaching final conditions of about 50°–60° pan angle and 15–30 rpm pan speed. During the first few minutes of pan operation a scraper may be needed to overcome an initial problem of sticking.

Granulated material is then fed to a dryer, such as an inclined rotary drum dryer. Typical drying conditions comprise heating for about 5 to 10 minutes at an air temperature of from about 65°–80° C., followed by about 20-30 minutes at about 120°-150° C. These conditions simulate the operations of a continuous counter-current dryer. The low temperature is applied at the beginning in order to prevent thermal shock and breakage. The final moisture content of the granular product is reduced to about 1% or less and preferably to a moisture content in the range of about 0.3 to 1%.

The drying step achieves good bonding between the high surface area solid particles and salt crystals on the surface of the solid which are formed from the saturated solution of salt during the drying stage.

The resulting product is characterized by a crush strength of over about 3 lbs and generally in the range of about 5 to 10 lbs/granule and a particle size distribution in the range of about 2 to 4 mm.

Referring to the flow diagram shown in the drawing it will be seen that the process contemplates the weighing and mixing of salt particles and insoluble powders from storage bins or the like. Recycled undersize product, i.e., less than 2 mm (−12 mesh) material, may also be added to the mixture.

The powders next may be dry blended and then mixed with water or saturated water solution or may be mixed directly with water or saturated water solution in the desired proportions.

As shown in the diagram, the wet blend from the mixing step may then be processed continuously through the granulation and drying stages. The undersized product, although the amount of undersized product is usually less than about 20%, is recycled for mixing with fresh ingredients and reprocessing. A smaller amount of oversize product is produced, generally about 10% or less, and this may be disposed of or ground and recycled.

The invention will be more fully appreciated by reference to the following detailed examples.

EXAMPLE 1

20 g of North Carolina phosphate rock (30% $P_2O_5$), about 87% of which had a particle size of −325 mesh, was dry blended with 380 g of ammonium sulfate using a SUNBEAM electric kitchen mixer.

The ammonium sulfate was ground to −30 mesh and had the following sieve analysis:

| Screen Mesh Size (Tyler) | +30 | +65 | +100 | +140 | +200 | +325 |
|---|---|---|---|---|---|---|
| % Retained On | 0 | 39 | 21 | 19 | 12 | 6 |

The powders were mixed dry for about 10 seconds, to provide a 95% salt −5% rock mixture. Then about 45 ml $H_2O$ were added from a buret to provide a moisture content of about 10%.

The wet blend was then granulated by feeding it to a 16" laboratory scale pan granulator. The pan was operated initially at an angle of about 70° and a speed of about 5 rpm. The angle and speed were adjusted during granulation over a period of about 25 minutes to achieve a "rolling bed" and the final pan conditions were about 60° pan angle and about 15 to 25 rpm speed of rotation.

The resulting granules were fed to a 10" rotary drum dryer heated with an electric hand-gun heater. The granules were dried by being heated for about 5 minutes at 70° C., followed by heating at 150° C., for about 25 minutes. The moisture content of the final product was less than 1%.

About 75-80% of the granular product had a size distribution in the 2-4 mm range and average crush strength was about 5 lbs/granule.

It should be noted that the granular product was in the range of 40-60% from the batch. The remainder of the material were fines. Prior work with phosphate rock granulation indicates that the same ratio of granular product/fines from the same laboratory equipment corresponds to 70-80% of granular product in a commercial product. The differences are due to the better operation of the scale-up pan.

EXAMPLE 2

Example 1 was repeated at three different moisture contents for the wet blend. The effect on granule size is shown in the following table:

| % Moisture (Dry Base) | Oversize % +4 Mesh | Undersize % −12 Mesh |
|---|---|---|
| 10.5 | 6 | 35 |
| 11.2 | 8 | 16 |
| 11.9 | 21 | 18 |

The mesh size range of 4 to 12 (Tyler) roughly defines the particle size distribution for the desired product of from about 2 to 4 mm. Thus, those particles which are retained on a 4 mesh, i.e., are +4 in size, are oversize and those which pass through a 12 mesh, i.e., are −12 in size, are undersize. It will be seen that for the specific salt/insoluble powder system of Example 1, control of the moisture content at 11.2% produces granules 75% of which fall within the 2-4 mm size range, i.e., are smaller than 4 and larger than 12 mesh.

EXAMPLE 3

Example 1 was repeated, but the amount of the phosphate rock was varied. The effect of such variation is reflected in the following table:

| Effect of Percentage of Rock: | | | | | |
|---|---|---|---|---|---|
| % Rock | 0 | 1.25 | 2.5 | 5 | 10 |
| Av. Crush Strength (lb/granule) | 1.75 | 3.5 | 4.25 | 5.5 | 6.75 |

It will be seen that the average crush strength of the granules exceeds 3 lbs/granule with only 1.25% phosphate rock and increases to 6.75 lbs/granule as the amount of phosphate rock is increased to 10%.

EXAMPLE 4

97.5% ammonium sulfate as used in Example 1 was mixed with 2.5% $CaCO_3$ (−100 mesh) and then mixed with 8.5% $H_2O$ according to the procedure of Example 1. The wet blend was processed generally as in Example 1. The granular product contained about 87% of granules in the 2-4 mm range. The particle crush strength for various size fractions is set forth in the following table:

| Screen mesh (Tyler) | +4 | +6 | +8 | +10 |
|---|---|---|---|---|
| % Retained On | 13 | 31 | 29 | 2 |
| Crush Strength (lb/granule) | 9.7 | 6.5 | 4.5 | 3 |

EXAMPLE 5

The procedure of Example 1 was followed by 97.5% of ammonium sulfate salt was mixed with 2.5% of −100 mesh analytical grade carbon black and the dry blend was mixed with H₂O to give a 10% moisture content. Granulation and drying of the wet blend conducted generally as described in Example 1, gave a product 64% of which was in the desired size range of 2-4 mm. The crush strengths of fractions of the product are given in the following table.

| Screen Mesh (Tyler) | +4 | +6 | +8 | +10 |
|---|---|---|---|---|
| % Retained On | 12 | 18 | 32 | 12 |
| Crush Strength (Lb/grannle) | 10.6 | 8 | 5.2 | 3.1 |

EXAMPLE 6

97.5% of potassium chloride, ground to −30 mesh was mixed with 2.5% North Carolina Phosphate Rock as described in Example 1. The dry blend was mixed with 13.5% H₂O and the wet blend was then generally processed in accordance with the procedures of Example 1.

70% of the product granules were in the 4-12 Tyler mesh size, i.e., within the size distribution of 2-4 mm. The crush strength of the predominant fraction of 60% which passed through the 4 mesh but was retained on the 10 mesh screen was 12 lbs/granule.

EXAMPLE 7

Example 1 was repeated but 5% of Pescha Phosphate Rock (Columbia) was substituted for the North Carolina Phosphate Rock and the blend was mixed with water and processed generally as in Example 1.

About 65% of the product was in the desired 2-4 mm size range and the average crush strength of these granules was about 5 lbs/granule.

EXAMPLE 8

The procedure of Example 1 was repeated using 396 g of flotation product of KCL from D.S.W.—Israel, and 4 gr of Israel Rock from Oron and 49 ml H₂O. The size distribution of the KCL is set forth in the following table:

| Screen Mesh (Tyler) | +60 | +100 | +140 | +200 |
|---|---|---|---|---|
| % Retained On | 28% | 43 | 20 | 9 |

The resulting product had a satisfactory strength (above 4 lb/granule) and 70% of the granular material was in the 2-4 mm size range.

EXAMPLE 9

The procedure of Example 1 was repeated using 198 g of the KCL flotation product (from D.S.W. Israel—described in Example 8) was mixed with 198 g of crystaline KCL (from D.S.W. Israel). 4 g of Israel rock from Oron was added. The size distribution of the crystaline material is set forth in the following table:

| Screen Mesh (Tyler) | +30 | +40 | +50 | +60 | +100 | +140 |
|---|---|---|---|---|---|---|
| % Retained On | 0 | 6 | 25 | 18 | 34 | 17 |

The resulting product had average strength of above 7 lb/granule, and 80% of the granular product was in the 2-4 mm size range.

In the above examples which are based upon Example 1, it has been stated in a few instances that the procedure of Example 1 was followed in "general." This qualification was noted because certain minor variations in conditions may have been introduced. For example, in pan granulation, expecially using a small laboratory scale, pan as was used in conducting the granulation processes reported in the examples, each wet blend needs to be processed at slightly varying pan angles and/or rotation speeds to obtain the desired "rolling bed" effect, an effect well known to those skilled in the art. Likewise, those skilled in the art would understand that minor variations in granulation times and drying times and temperatures might be made to suit particular blends, but all such parameters are close to those set in Example 1 and within the broader ranges described elsewhere in the specification, so that one skilled in the art should encounter no difficulty in practicing the invention.

What is claimed is:

1. A granular salt product comprising free flowing granules containing from about 70 to 99% by weight of a water soluble salt selected from the group consisting of ammonium sulfate, ammonium nitrate, potassium chloride and potassium sulfate, from 1 to 30% by weight of an insoluble solid material and about 1% by weight or less of water based upon the combined weight of said salt and said insoluble solid material, said granules having a relatively uniform size distribution in the range of from about 2 to 4 mm and a crush strength of above about 3 lbs/granule.

2. The product of claim 1 wherein said insoluble material is selected from the group consisting of phosphate rock, calcium carbonate, calcium sulfate and carbon black.

3. The product of claim 2 wherein said granules contain from about 95 to 99% of said salt and from about 1 to 5% of said insoluble material.

4. The product of claim 3 wherein the average crush strength of said granules is above about 5 lbs/granule.

5. The product of claim 1 wherein a mixture of soluble salts are used instead of a single salt.

* * * * *